United States Patent
Bolshtyansky et al.

(10) Patent No.: US 8,462,430 B2
(45) Date of Patent: Jun. 11, 2013

(54) OPTICAL FIBER AMPLIFIER AND A CONTROL METHOD THEREFOR

(75) Inventors: Maxim Bolshtyansky, East Windsor, NJ (US); Gregory Cowle, Red Bank, NJ (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 13/533,878

(22) Filed: Jun. 26, 2012

(65) Prior Publication Data

US 2012/0327506 A1 Dec. 27, 2012

Related U.S. Application Data

(62) Division of application No. 12/370,556, filed on Feb. 12, 2009, now Pat. No. 8,233,214.

(60) Provisional application No. 61/028,429, filed on Feb. 13, 2008.

(51) Int. Cl.
 *H01S 3/00* (2006.01)
(52) U.S. Cl.
 USPC .................................. 359/341.32; 359/341.3
(58) Field of Classification Search
 USPC .......................................... 359/341.32, 341.3
 See application file for complete search history.

(56) References Cited

U.S. PATENT DOCUMENTS

| | | | |
|---|---|---|---|
| 5,050,949 A | 9/1991 | DiGiovanni et al. | 359/337.4 |
| 5,355,248 A | 10/1994 | Hadjifotiou | 359/341.3 |
| 5,406,411 A | 4/1995 | Button et al. | 359/341.33 |
| 5,561,552 A | 10/1996 | Shibuya | 359/341.33 |
| 5,778,132 A | 7/1998 | Csipkes et al. | 385/135 |
| 5,991,069 A | 11/1999 | Jander | 359/337 |
| 6,011,645 A | 1/2000 | Hong | 359/337.5 |
| 6,134,047 A | 10/2000 | Flood et al. | 359/337.12 |
| 6,313,938 B1 | 11/2001 | Shikii et al. | 359/333 |
| 6,384,965 B2 | 5/2002 | Akiyama | 359/341.4 |
| 6,388,806 B1 | 5/2002 | Freeman et al. | 359/341.3 |
| 6,445,493 B2 | 9/2002 | Kohnke et al. | 359/337.1 |
| 6,563,630 B1 | 5/2003 | Jacob et al. | 359/341.2 |
| 6,580,552 B2 | 6/2003 | Welch | 359/341.32 |
| 6,603,896 B1 | 8/2003 | MacCormack et al. | 385/24 |
| 6,658,189 B2 | 12/2003 | Ajima et al. | 385/123 |
| 6,839,163 B1 | 1/2005 | Jakobson et al. | 359/341.1 |
| 6,917,731 B2 | 7/2005 | Bennett et al. | 385/15 |
| 7,006,280 B2 | 2/2006 | Huang et al. | 359/337.1 |
| 7,072,100 B2 | 7/2006 | Nishihara et al. | 359/337.2 |
| 7,162,108 B2 | 1/2007 | Sala et al. | 385/2 |
| 7,224,517 B2 | 5/2007 | Sugaya et al. | 359/337.4 |
| 7,295,365 B2 | 11/2007 | Sommer et al. | 359/341.32 |
| 7,330,303 B2 * | 2/2008 | Sato et al. | 359/341.33 |
| 7,400,441 B2 * | 7/2008 | Muro et al. | 359/334 |
| 7,864,410 B2 * | 1/2011 | Kakui | 359/337.2 |
| 2007/0291358 A1 | 12/2007 | Colbourne et al. | 359/495 |

* cited by examiner

*Primary Examiner* — Mark Hellner
(74) *Attorney, Agent, or Firm* — Matthew A. Pequignot; Pequignot + Myers LLC

(57) ABSTRACT

An optical amplifier having two erbium doped fiber coils and a pump laser diode is described. A tunable optical power splitter is used for variably splitting the optical pump power for the laser diode between the two erbium doped fiber coils, and variable tilters can be used for correcting the gain tilt of the amplifier. The variable splitter and the tilters can include thermally tunable Mach-Zehnder interferometers.

14 Claims, 16 Drawing Sheets

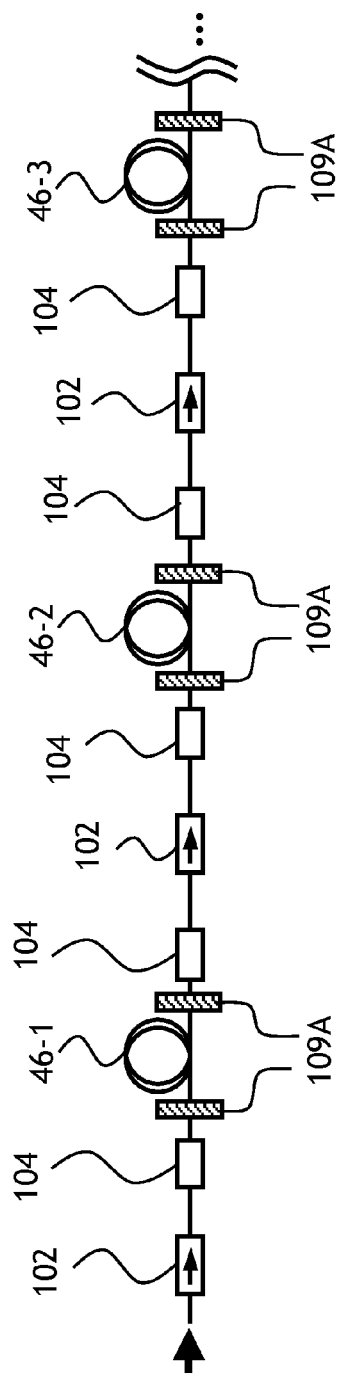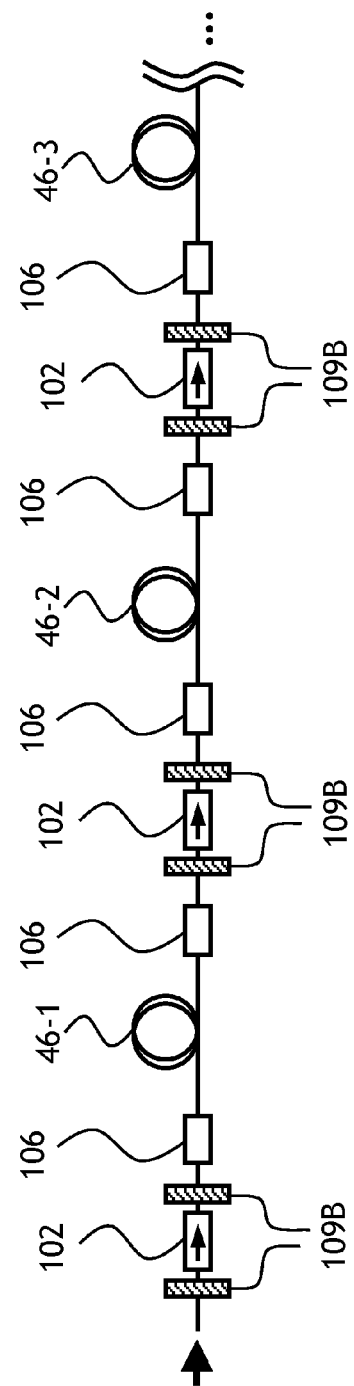
FIG. 10A
FIG. 10B

OPTICAL FIBER AMPLIFIER AND A CONTROL METHOD THEREFOR

CROSS-REFERENCE TO RELATED APPLICATIONS

This application is a divisional application of U.S. patent application Ser. No. 12/370,556 filed on Feb. 12, 2009, entitled "OPTICAL FIBER AMPLIFIER AND A CONTROL METHOD THEREFOR", which claims priority from U.S. Patent Application No. 61/028,429 filed Feb. 13, 2008, entitled "Novel Components In Relation To PLC Amplifier", by Bolshtyansky et al. All claims of priority to these applications are hereby made, and each of these applications is hereby incorporated herein by reference for all purposes.

TECHNICAL FIELD

The present invention relates to optical fiber amplifiers, and in particular to erbium doped fiber amplifiers used in optical transmission systems, and methods of control of such amplifiers.

BACKGROUND OF THE INVENTION

In a wavelength division multiplexing (WDM) optical transmission system, optical signals at a plurality of wavelengths are encoded with digital streams of information. These encoded optical signals, or optical channels, are combined together and transmitted through a series of spans of an optical fiber comprising a transmission link of a WDM fiberoptic network. At a receiver end of the transmission link, the optical channels are separated, whereby each optical channel can be detected by an optical receiver.

While propagating through an optical fiber, light tends to lose power. This power loss is well understood and is related to the physics of propagation of light in the fiber. Yet some minimal level of optical channel power is required at the receiver end to decode information that has been encoded in an optical channel at the transmitter end. To boost optical signals propagating in an optical fiber, optical amplifiers are deployed at multiple locations, known as nodes, along the transmission link. The optical amplifiers extend the maximum possible length of the link, in some instances, from a few hundred kilometers to several thousand kilometers, by amplifying optical signals to power levels close to the original levels of optical power at the transmitter end.

An erbium-doped fiber amplifier (EDFA) is one of the most practical types of optical fiber amplifiers employed in many modern fiberoptic networks. A single EDFA module can amplify up to about a hundred of optical channels at a time, thus providing significant cost savings. One of the main components of an EDFA is a length of an amplifier optical fiber having a core doped with ions of a rare earth element erbium. One EDFA module can contain two or more erbium doped fibers. Each erbium doped fiber (EDF) is optically pumped by a semiconductor laser, so as to create a population inversion between energy states of the erbium ions comprising a gain medium of the EDF. Once the population inversion is created, the gain medium begins to amplify an optical signal propagating along the core of the EDF. The optical signal comprises a plurality of individual optical channels. The gain medium is characterized by a wavelength-dependent gain coefficient, from which amplification coefficients of these optical channels can be determined. During the amplification process, the optical power of the pump is absorbed by the gain medium, which simultaneously amplifies all the optical channels present. Therefore, the amplification coefficient of a particular channel depends on the optical power and the number of optical channels present, and on the optical power of the pump. When the number of optical channels changes due to switching and routing of some optical channels, the gain coefficient of the rest of the optical channels changes, usually in the form of a spectral tilt of the gain coefficient. At the same time, a goal of the amplifier is to provide constant gain, which should not depend on the power or wavelength loading condition; otherwise, some channels will not have sufficient power and signal-to-noise level at the receiver end, resulting in information being lost.

The control electronics of EDFAs partially solves the problem of the variable signal load. More particularly, the total optical power at the input and at the output of the amplifier is measured, and the average gain coefficient of the amplifier is calculated as the ratio of the output optical power to the input optical power. The amplifier control electronic circuitry adjusts the amplifier's pump powers through a feedback loop in such a way that the measured optical gain coefficient equals to the desired or "set" optical gain coefficient and is not varied significantly in time. The feedback loop also compensates for a gradual reduction of semiconductor laser pumping efficiency and a gradual reduction of EDF amplification coefficient over the lifetime of the amplifier.

Over the last few years, the performance of EDFAs has been improved mostly due to improvement of performance characteristics of individual components such as pump lasers, optical couplers, and the like. Control software and the EDFA control electronics have also been improved. Further improvement of EDFA performance is very difficult without increasing the number of amplifier components. Increasing component count has been hindered by a substantial downward market pressure on EDFA cost and size.

Despite this downward market pressure, the technology base of an EDFA has not changed substantially. EDF remains the gain medium, semiconductor lasers are used to pump the EDF, and discrete fiber-coupled components such as optical taps and WDM couplers, optical isolators, gain flattening filters, and variable optical attenuators, are still used to properly couple and guide signal light and pump light. Fiber-coupled photodiodes are used to measure input and output optical power levels. Fiber splicing is used to optically couple the components together. As a result, a typical prior-art EDFA has numerous splices, splice protectors, discrete components, and optical fiber loops. The multitude of components and fiber loops make EDFAs of the prior art complex and costly. Using prior-art technologies and approaches, it is possible to further improve performance by substantially increasing cost of an EDFA, which is prohibitive in the present market environment. It is also possible to further reduce amplifier costs by sacrificing EDFA performance characteristics such as the spectral gain tilt, flatness of the gain spectrum, and the noise figure of the EDFA, which is undesirable from the standpoint of maintaining a high level of technical performance.

It is therefore a goal of the present invention to provide an EDFA that allows for reduction of size, complexity, and cost without compromising the optical performance. Correspondingly, it is also a goal of the present invention to provide an EDFA that allows addition of new components and further optical performance improvement at a small incremental cost, as compared to the cost of equivalent discrete components.

An EDFA of the present invention meets the above stated goals. New components can be added to an EDFA at a small incremental cost. By using the present invention, it is possible to improve EDFA characteristics and, or introduce additional functionality with minimal cost and size increases.

Furthermore, the present invention facilitates usage of new integrated EDFA components. These new components further improve performance and reliability of an EDFA of the present invention and enable more efficient control of key EDFA performance characteristics, while allowing for a considerable size and cost reduction.

SUMMARY OF THE INVENTION

In accordance with the present invention, a planar lightwave circuit (PLC) is used as a platform for integration of WDM couplers and taps. The erbium doped fiber (EDF) and pump diode lasers are coupled to the PLC by using a fiber array. A multiport reflective optical isolator and a photodiode array are coupled mechanically and optically to a side of the PLC. Thus, fiber pigtails are eliminated and the EDFA footprint is considerably reduced. In addition to replacing discrete components with their PLC equivalents, and thereby replicating the performance of a regular EDFAs, PLC-based EDFAs can also use novel components not conventionally used in EDFA, such as tunable optical power splitters and tunable spectral tilters. This allows a PLC-based EDFA to have improved performance over a large dynamic range.

In accordance with another aspect of the present invention, the PLC has a serially connected pair of tunable Mach-Zehnder interferometers for lessening the gain tilt of the optical amplifier and, or for variably attenuating light passing therethrough, in dependence upon second and third control signals applied to the Mach-Zehnder interferometers.

In accordance with another aspect of the invention, the PLC-based optical amplifier has a gain flattening filter for flattening the gain profile of the optical amplifier, wherein the gain flattening filter is mechanically coupled to the side surface of the PLC, and optically coupled to the first and the second amplifier fibers.

In accordance with another aspect of the invention, there is further provided an optical amplifier having an average gain coefficient, a gain tilt, a gain ripple parameter, a maximum pump power parameter, and a noise figure parameter, the optical amplifier comprising:

an input port for inputting light;

a first amplifier fiber optically coupled to the input port, for amplifying light;

a second amplifier fiber optically coupled to the first amplifier fiber, for further amplifying light;

a semiconductor laser for pumping the first and the second amplifier fibers, in dependence upon a drive signal applied thereto;

a tunable optical power splitter optically coupled to the semiconductor laser, for splitting light from said semiconductor laser into a first path and a second path in dependence upon a first control signal applied to the optical power splitter, wherein the first and the second paths are optically coupled to the first and the second amplifier fibers, respectively; and a controller suitably programmed to achieve a pre-determined average gain coefficient and, or a pre-determined gain tilt, while keeping the gain ripple parameter, the maximum pump power parameter, and the noise figure parameter below pre-defined threshold levels, by applying the drive signal to the semiconductor laser, and applying the first control signal to the tunable optical power splitter.

BRIEF DESCRIPTION OF THE DRAWINGS

Exemplary embodiments will now be described in conjunction with the drawings in which:

FIGS. 10A and 10B are optical circuits of a multi-stage optical fiber amplifier having a distributed GFF according to the present invention;

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
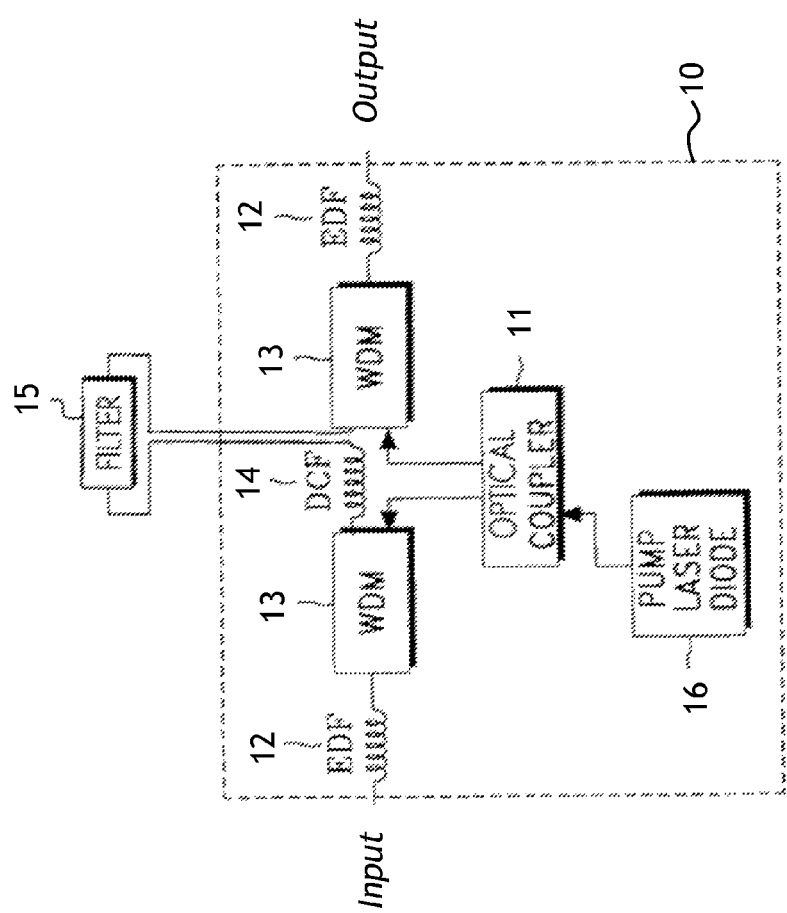
FIG. 1 is an optical circuit of a prior-art dual-stage optical amplifier having a single pump laser diode.

Referring to FIG. 1, an optical circuit of a prior-art dual-stage erbium doped fiber amplifier (EDFA) 10 is depicted. The EDFA 10 has two erbium-doped fiber (EDF) coils 12 between "Input" and "Output" ports as shown, two wavelength division multiplexing (WDM) couplers 13, a dispersion-compensating fiber 14, a gain flattening filter (GFF) 15, an optical coupler 11, and a pump laser diode 16. The pump light from the pump laser diode is split in two paths, each being coupled through the WDM 13 to a respective EDF coil 12 as shown with arrows in FIG. 1. Using the coupler 11 reduces cost of the amplifier 10 because only one pump laser source 16, and not two, is required to pump two EDF coils 12. Detrimentally, since the splitting ratio of the optical coupler 11 is fixed, the degree of control of the amplifier is limited to a single parameter, namely a pump current of the pump laser diode 16. If there were two laser diodes each coupled to a separate EDF, the amplifier would be better controlled since the levels of pumping of the EDF coils 12 would be independently adjustable. Thus, a tradeoff is achieved between cost and performance of the optical amplifier 10.

Further, detrimentally, the amplifier 10 is built using discrete components 11 to 16 and fiber splices, not shown. The size of the amplifier 10 is comparatively large because of many fiber splices and fiber loops that need to be accommodated. The cost of the amplifier 10 is high due to high cost of individual components 11 to 16. It should be noted that the GFF 15 is typically one of the most costly passive components, due to tight optical tolerances for the spectral transmission of the filter 15.

Figure 2:
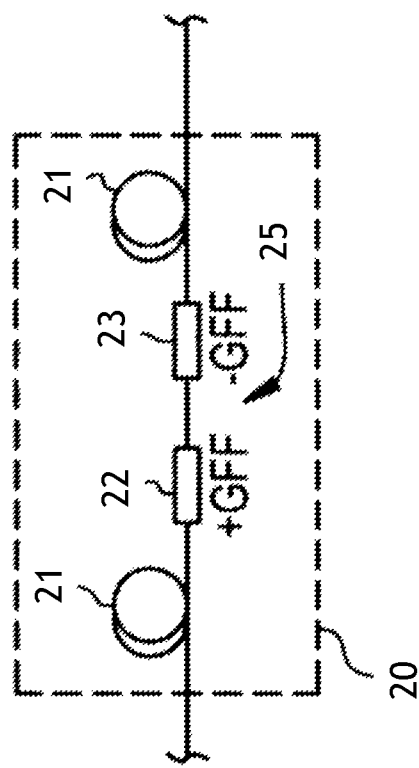
FIG. 2 is an optical circuit of a prior-art dual-stage optical amplification train having a dual gain flattening filter (GFF)

The issue of high cost of GFF has been addressed in the prior art. Referring now to FIG. 2, an optical circuit of a prior-art dual-stage optical amplification train 20 is shown having a matched pair 25 of GFFs 22 and 23 inserted between EDF coils 21. During fabrication of a thin-film GFF, many filters produced are spectrally shifted from the target wavelength to a shorter wavelengths or to a longer wavelength. Instead of discarding these out-of-specification filters, they can be combined in matched pairs such as the pair 25, so as to offset the positive wavelength shift of the filter 22 with the negative wavelength shift of the filter 23. Since the cost of out-of-specification GFFs is less than one half of an in-specification GFF, the total EDFA cost can be reduced.

Figure 3:
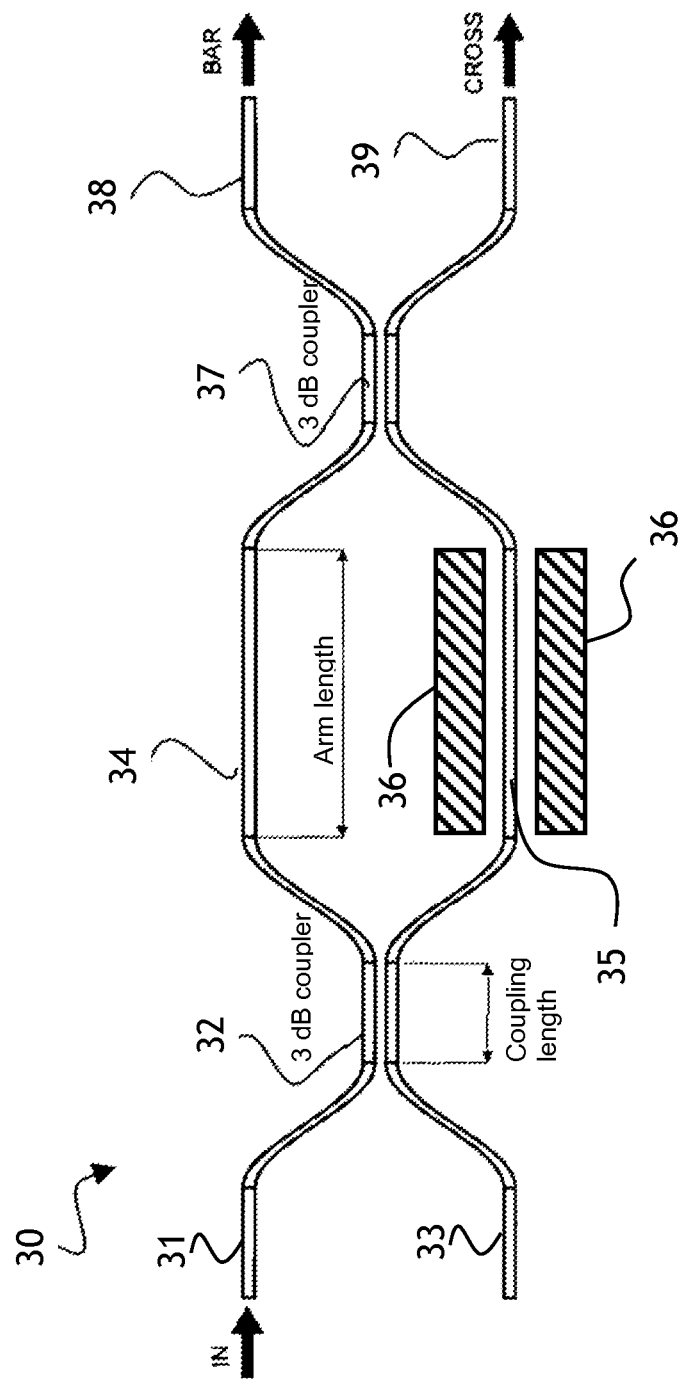
FIG. 3 is a plan view of a balanced tunable planar lightwave circuit (PLC) Mach-Zehnder interferometer used in a tunable pump power splitter of the present invention.
Figure 4:
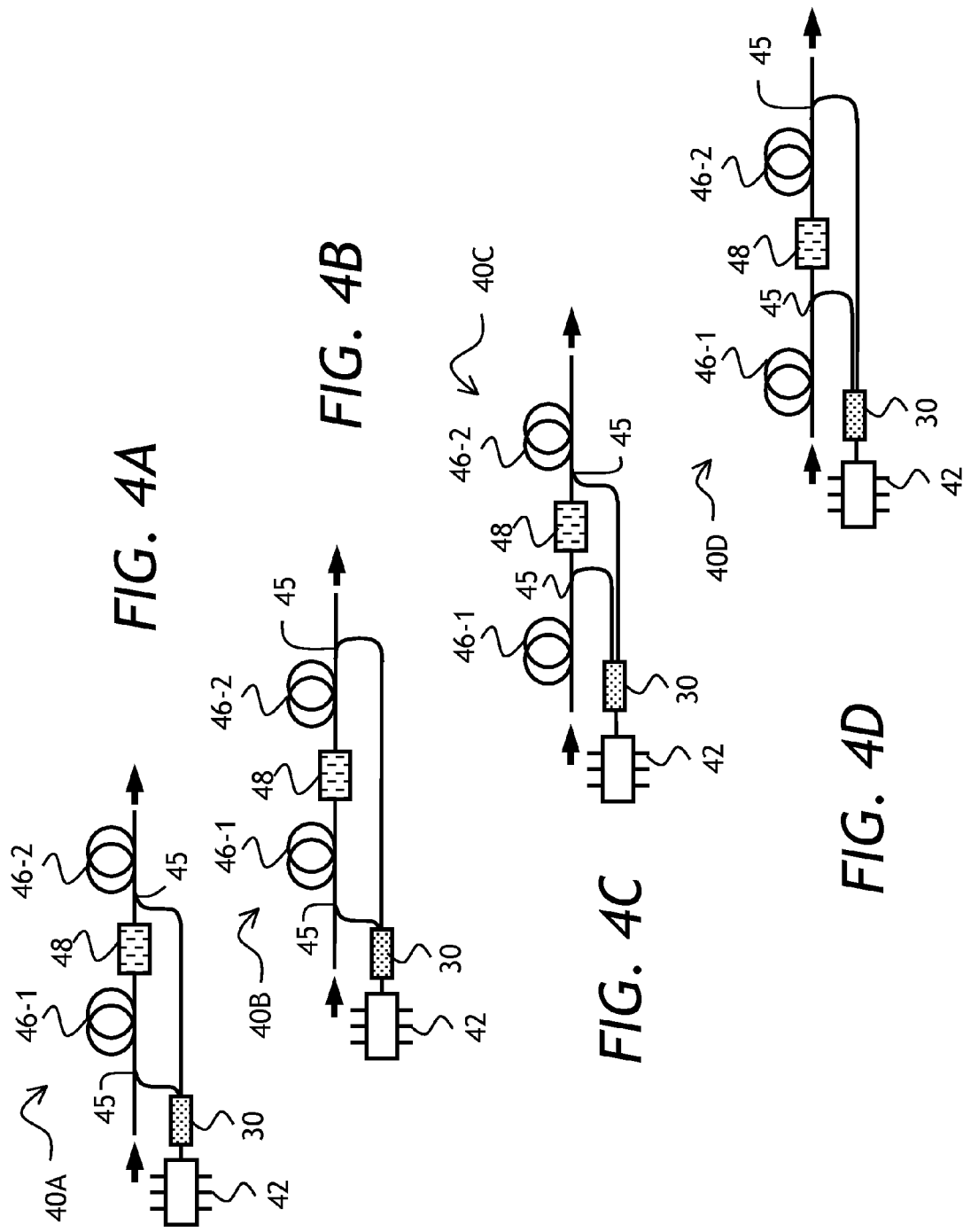
FIGS. 4A to 4D are optical circuits of a dual-stage optical amplifier having a single pump laser diode and a tunable optical power splitter according to the present invention.

Exemplary embodiments of various aspects of the present invention will now be described. Referring to FIG. 3, a preferred embodiment of a tunable pump power splitter 30 of the present invention is shown. The tunable pump power splitter 30 is based on a tunable planar lightwave circuit (PLC) Mach-Zehnder (MZ) interferometer. The light from a single pump laser diode, not shown, is coupled to an input waveguide 31. The pump light travels towards a first 3 dB coupler 32 consisting of two waveguides, the waveguide 31 and a waveguide 33, brought together so that evanescent coupling of guided light modes between the waveguides 31 and 33 can occur along a coupling length, as indicated in FIG. 3. The coupler 32 is a 3 dB coupler, that is, 50% of light is coupled to a branch 34, and 50% of light is coupled to a branch 35. The optical path length of the branch 35 defined as the physical path length multiplied by an effective refractive index along the path, is modified by a heater 36 disposed adjacent to the branch 35. When the heater 36 changes the temperature of the branch 35, the local refractive index changes due to thermal dependence thereof, which effectively changes the optical path length of the branch 35. The light guided by the waveguide branches 34 and 35 is coupled again by a second 3 dB evanescent coupler 37. Since optical coupling by an evanescent coupler is a coherent process, the fraction of pump light going to a "bar" output waveguide 38 and to a "cross" output waveguide 39 of the splitter 30 depends on the optical path length variation in the branch 35 that is dependent on local temperature created by the local heater 36. Therefore, by applying a control signal to the heater 36, in the form of an electrical current, one can effectively tune the optical power splitting ratio of the splitter 30 splitting the available pump power between two optical paths represented by the waveguides 38 and 39.

Referring now to FIGS. 4A to 4D, four preferred embodiments of dual-stage EDFAs 40A to 40D are shown, respectively. According to the present invention, the fiber amplifiers 40A to 40D each have a single pump laser diode 42, the tunable optical power splitter 30 of FIG. 3, two WDM couplers 45, EDF coils 46-1 and 46-2, and a mid-stage unit 48, which preferably has a GFF and, or a variable optical attenuator (VOA) and, or a variable tilter-variable optical attenuator (VT-VOA) described in more detail below. Other elements, such as isolators, taps, photodetectors, and a control unit, required for normal EDFA operation as is understood by those of skill in the art, are not shown in FIGS. 4A to 4D.

Horizontal arrows in FIGS. 4A to 4D depict the direction of propagation of an optical signal being amplified by the pair of EDF coils 46-1 and 46-2.

In operation, the pump light generated by the pump laser diode 42 is split into two paths, one for pumping the EDF coil 46-1 and one for pumping the EDF coil 46-2. Each of these coils can be forward-pumped or backward-pumped, depending on a particular EDFA construction and target characteristics. In the EDFA 40A, both EDF coils 46-1 and 46-2 are forward-pumped; in the EDFA 40B, the EDF 46-1 is forward-pumped, and the EDF 46-2 is backward-pumped; in the EDFA 40C, the EDF 46-1 is backward-pumped, and the EDF 46-2 is forward-pumped; and in the EDFA 40D, both EDF coils 46-1 and 46-2 are backward-pumped. By varying both a drive signal, that is, a pump current applied to the pump diode 42, and a first control signal, that is, a heating current applied to the tunable splitter 30 of FIG. 3, the optical pumping levels of the EDF coils 46-1 and 46-2 can be independently controlled with only one pump laser diode 42. Thus, a significant advantage over a prior-art EDFA of FIG. 1 is achieved, since independent control of the EDF coils pumping conditions results in improvement of EDFA performance characteristics, as is known to the one skilled in the art. An average optical gain coefficient defined above, a spectral gain tilt defined as an average per-wavelength change of an optical gain, a gain ripple parameter defined as a maximum variation of the optical gain coefficient from an averaged profile accounting for the averaged gain and the gain tilt, a maximum pump power required to achieve a pre-determined average optical gain and, or signal power, and especially a noise figure parameter defined as a ratio of the output to the input signal to noise ratios, can be improved this way, or a better tradeoff can be found therebetween, using a tunable pump splitter of the present invention, of which the splitter 30 is an exemplary embodiment.

The embodiments shown in FIGS. 4A to 4D will work with EDF and with other types of amplifier optical fibers as well, that is, optical fibers doped with suitable rare earth elements, such as ytterbium doped fibers used for amplifying light at a wavelengths of approximately 1050+−30 nm. Further, any suitable tunable pump splitter can be used, although the PLC-based tunable pump splitter is preferable, due to important advantages associated with utilizing PLC according to the present invention, as will be explained in more detail below. The pump laser types that can be used include single-emitter semiconductor lasers, fiber-coupled multi-emitter laser bars, multi-laser diodes, and so forth. Furthermore, a second pump laser can be coupled to the waveguide 33 of FIG. 3 if required, to "back up" the first laser and therefore to increase the overall reliability of the EDFAs 40A to 40D of FIGS. 4A to 4D, respectively.

Figure 5:
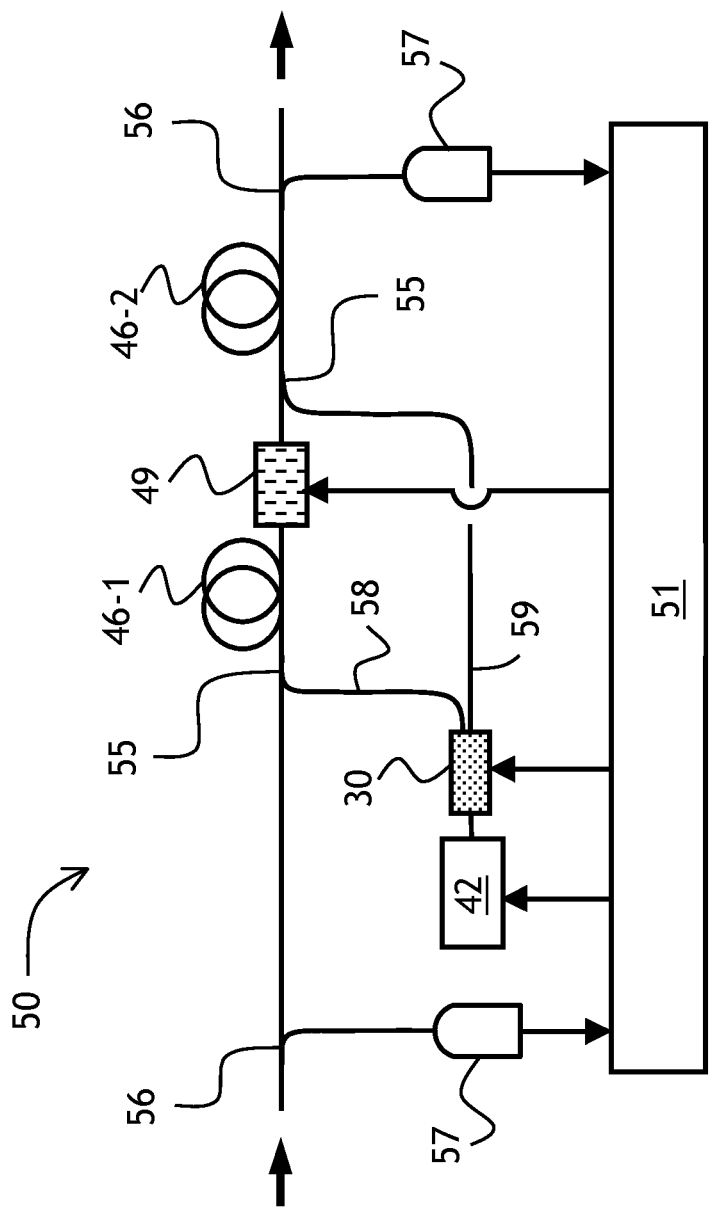
FIG. 5 is an optical diagram of a dual-stage EDFA with a tunable pump splitter and a variable tilter-variable optical attenuator (VT-VOA) according to the present invention.

Referring now to FIG. 5, an optical diagram of an exemplary embodiment of a dual-stage EDFA 50 is shown, the EDFA 50 having the tunable splitter 30 and a tunable tilter-variable optical attenuator (VT-VOA) 49, the pump semiconductor laser, or the laser diode 42, the EDF coils 46-1 and 46-2, two photodetectors 57, two optical taps 56, and a controller 51. Optical isolators are not shown in FIG. 5. Horizontal arrows in FIG. 5 depict the direction of propagation of an optical signal being amplified by the pair of EDF coils 46-1 and 46-2. Vertical arrows denote corresponding electrical connections between the photodetectors 57, the pump laser 42, the VT-VOA 49, and the tunable splitter 30 on one hand, and the controller 51 on the other. In operation, pump light from the pump laser diode 42 is split by the tunable splitter 30 into two optical paths 58 and 59 and is coupled by two WDMs 55 to the EDF coils 46-1 and 46-2, respectively. The pump current of the pump laser diode 42, as well as the heater current of the tunable splitter 30 are adjusted depending on the average optical gain calculated by the controller 51 based on photocurrents received from the photodetectors 57. Furthermore, control signals are applied to the VT-VOA 49, so as to control the attenuation setting and the attenuation spectral tilt setting of the VT-VOA 49 disposed in between the EDF coils 46-1 and 46-2. The presence of the mid-stage VT-VOA 49 allows one to further improve the performance characteristics of the EDFA 50.

Figure 6:
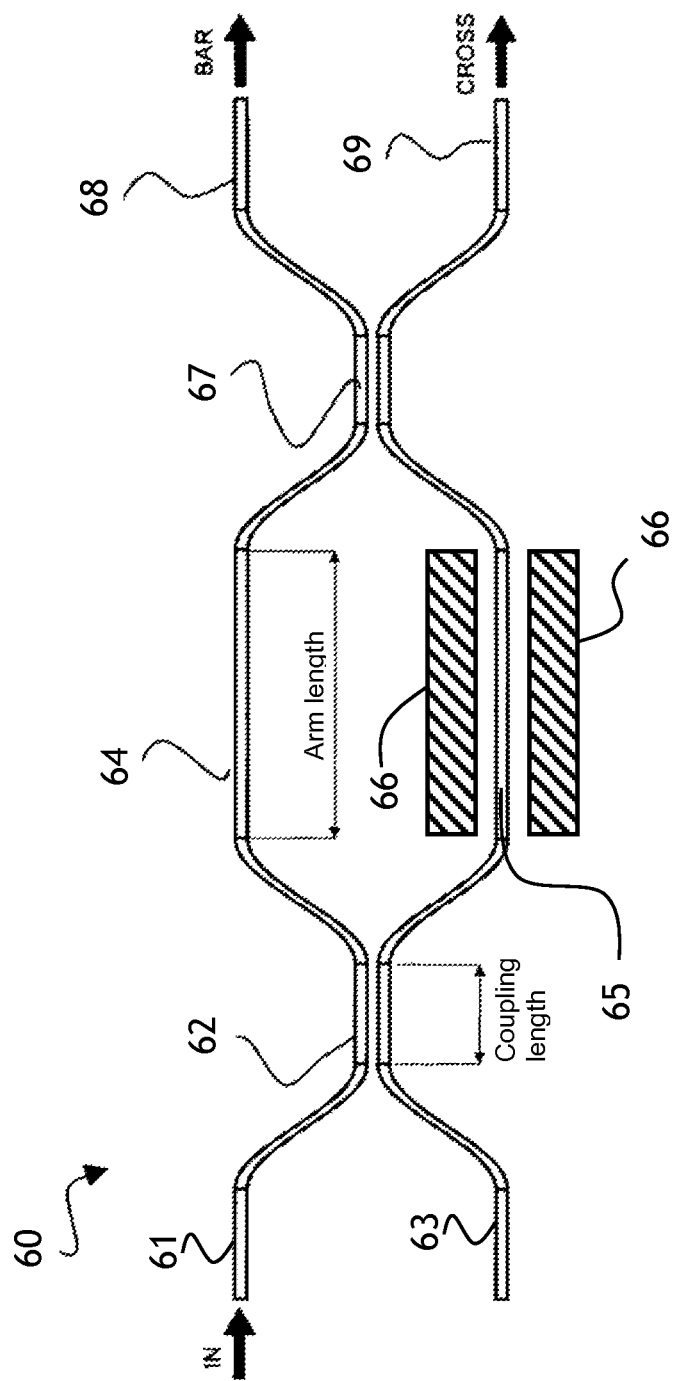
FIG. 6 is a plan view of an imbalanced tunable PLC Mach-Zehnder interferometer used in the VT-VOA according to the present invention.

The construction and the function of the VT-VOA 49 of the present invention will now be described in detail. The VT-VOA 49 preferably has two imbalanced MZ interferometers connected in series. Turning now to FIG. 6, one such imbalanced PLC MZ interferometer 60 is shown having two input waveguides 61 and 63 coupled at an evanescent coupler 62 having two branches 64 and 65 extending therefrom. The branches 64 and 65 are coupled by a second evanescent coupler 67 coupled to a "bar" output waveguide 68 and to a "cross" output waveguide 69. Since optical coupling by an evanescent coupler is a coherent process, the fraction of pump light going to the "bar" output waveguide 68 and to the "cross" output waveguide 69 of the PLC MZ interferometer 60 will depend on the optical path length variation in the branch 65 that is dependent on local temperature created by a local heater 66. Therefore, by applying a second control signal to the heater 66, in the form of an electrical current, one can effectively change the amount of optical power coupled into the "bar" waveguide 68. The evanescent couplers 62 and 76 are preferably imbalanced couplers, e.g. 80%/20% or even 90%/10% couplers.

Figure 7:
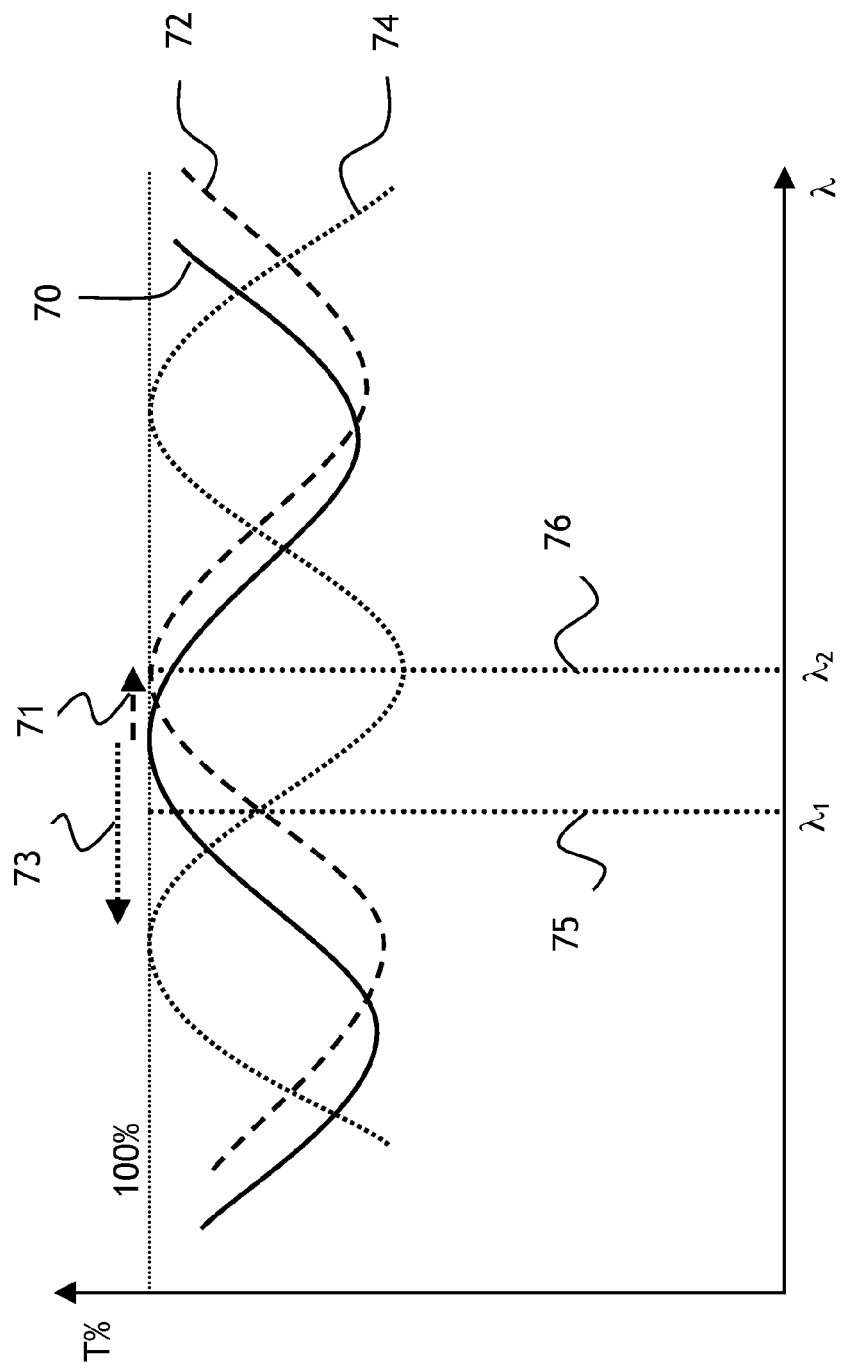
FIG. 7 is an optical transmission spectral plot of the imbalanced tunable PLC Mach-Zehnder interferometer of FIG. 6.

Referring now to FIG. 7, optical transmission spectral plots 70, 72, and 74 of the imbalanced tunable PLC Mach-Zehnder interferometer 60 of FIG. 6 is shown. The plots 70, 72, and 74 are transmission spectra between the waveguides 61 and 68 of the interferometer 60 at differing temperatures of the heater 66. The plot 70 is the transmission spectrum at a nominal temperature of the heater 66, corresponding to a minimal attenuation of light occupying a spectral band between wavelengths $\lambda_1$ and $\lambda_2$. The spectral band boundaries are denoted by dotted lines 75 and 76. Changing the temperature causes the plot 70 to shift as shown with arrows 71 and 73. It is seen from FIG. 7 that by changing the temperature of the heater 66, a positive or negative spectral tilt can be introduced within the spectral band between the wavelengths $\lambda_2$ and $\lambda_2$.

Figure 8:
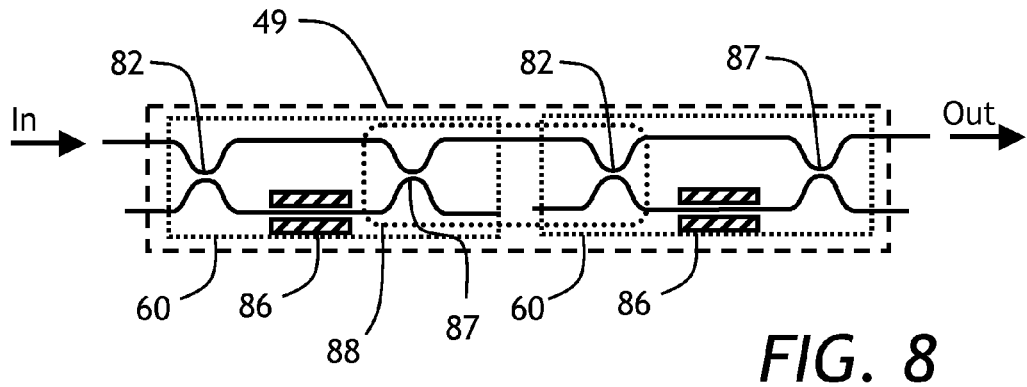
FIG. 8 is an optical curcuit of the VT-VOA of FIG. 5.

Turning now to FIG. 8, a preferred embodiment of the VT-VOA 49 of the present invention is shown having two imbalanced MZ interferometers 60 connected in series, each having an input evanescent coupler 82, an output evanescent coupler 87, and an individually controlled heater 86. It is recognized by the skilled in the art that the middle pair of the couplers 82 and 87, located within a dotted rectangle 88 in FIG. 8, can be replaced with a single 2×2 evanescent coupler, not shown, and a construction involving such a replacement is still considered herein as "a pair of MZ interferometers" within the scope and for the needs and purposes of the present invention.

Figure 9:
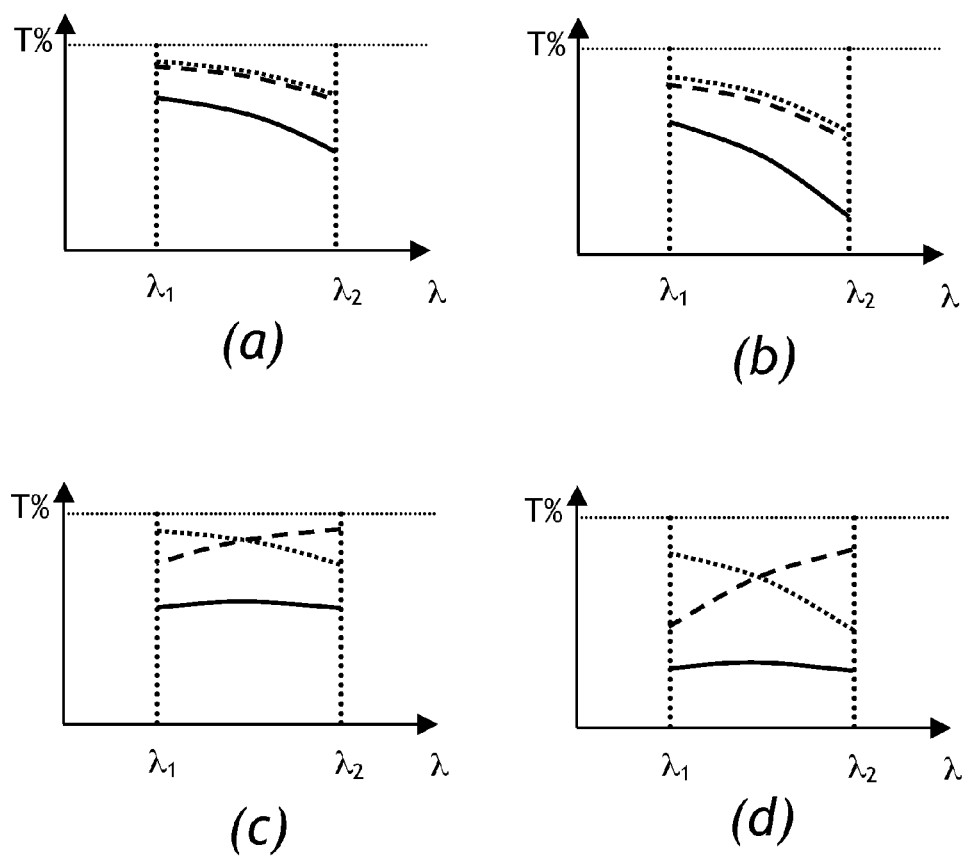
FIG. 9 is a set of optical transmission spectral plots (a), (b), (c), and (d) illustrating the principle of operation of the VT-VOA of FIG. 5.

The performance of the VT-VOA 49 of the present invention will now be explained. Referring to FIG. 9, four sets of transmission spectra (a) to (d) are shown for spectral band between the wavelengths $\lambda_1$ and $\lambda_2$. In the spectra (a) to (d), dashed and dotted lines represent transmission spectra of individual interferometers 60 of the VT-VOA 49 of FIG. 8, whereas a solid line represents the resulting transmission spectrum of the VT-VOA 49. The set of spectra (a) corresponds to a case when the spectral tilt of transmission spectra of individual interferometers has the same sign corresponding to the transmission decreasing with wavelength. In the set of spectra (b), the magnitude of the tilt is increased as a result of the addition of the individual spectra. The set of spectra (c) corresponds to a case when the spectral tilt of transmission spectra of individual interferometers has the opposite signs, so that a very little or no tilt is produced as a result. In the set of spectra (d), the magnitude of transmission is further decreased, again with a negligible resulting spectral tilt. Therefore, by changing the currents flowing through the two heaters 86 of the VT-VOA 49, the attenuation and the spectral tilt settings of the VT-VOA 49 can be independently and simultaneously varied as is shown in the sets of spectra (a) through (d). The control signals applied to the VT-VOA 49 comprise the second control signal introduced above, and a third control signal. Each of these two control signals is an electric current applied to the corresponding heater 86 in FIG. 8.

Turning now to FIGS. 10A and 10B, optical circuits of yet another embodiment of a multi-stage optical fiber amplifier of the present invention are shown. The circuits have serially connected EDF coils 46-1 to 46-3, isolators 102, GFFs 109A and 109B, and additional elements 104 and 106, respectively. The elements 104 and 106 symbolize optical couplers, WDM couplers, taps, and bandpass filters, which are inserted into the optical train of an EDFA to pump the EDF coils and to route the optical signal being amplified, as is well known to and understood by those skilled in the art. An essential feature of the fiber amplifiers of FIGS. 10A and 10B is that a single GFF is replaced by many GFFs distributed throughout the optical train, as shown. In the amplifier of FIG. 10A, the filters 109A are disposed on the opposite sides of the EDF coils 46-1, 46-2, and 46-3. In the amplifier of FIG. 10B, the filters 109B are disposed on the opposite sides of the isolators 102. It is known in the art that distributing optical losses in the optical train, including the optical loss due to the GFF, leads to improvement of overall amplifier characteristics. However, before the present invention, using many GFFs in a single optical amplifier was of little practical value due to high cost of individual GFFs, as was mentioned in a section discussing FIG. 1 and FIG. 2 above.

Figure 11A:
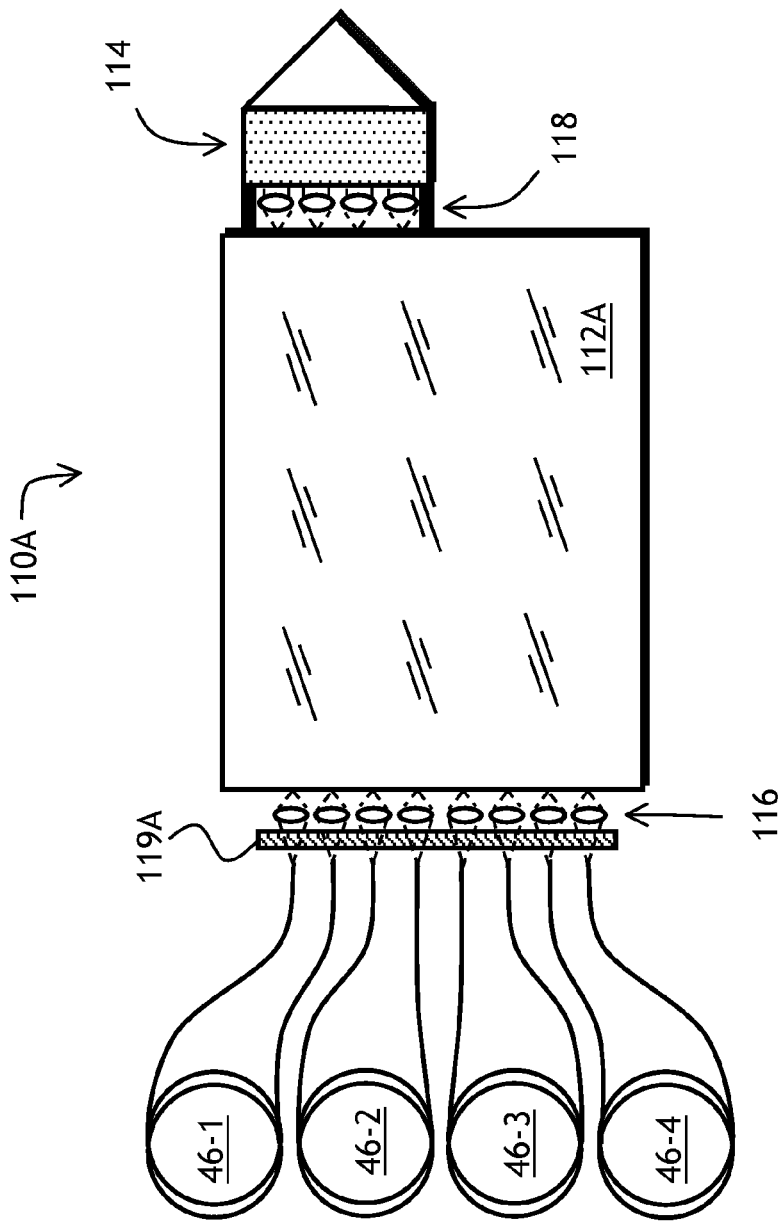
FIGS. 11A and 11B are plan views of preferred embodiments of the multi-stage PLC optical fiber amplifier with a GFF chip attached to the PLC.
Figure 11B:
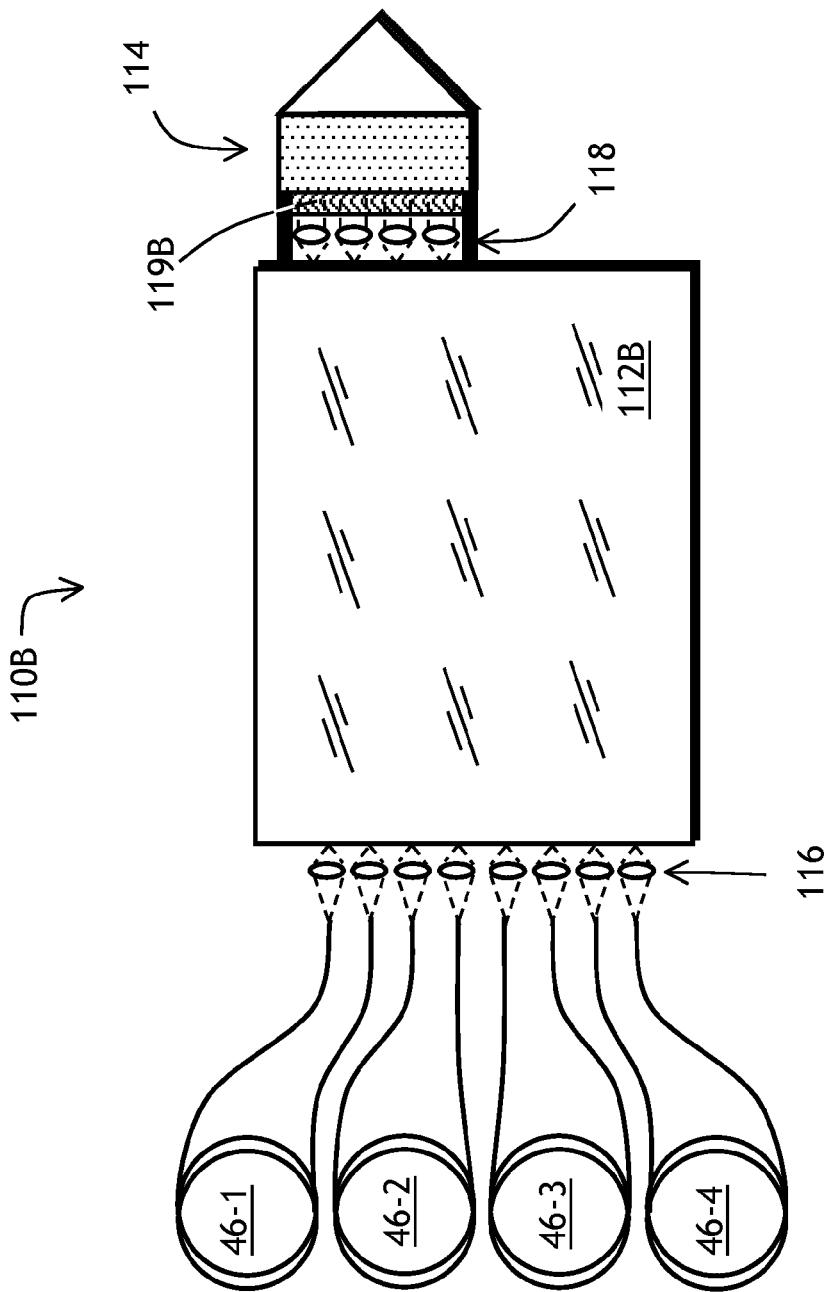

Turning now to FIGS. 11A and 11B, a packaging for an optical amplifier of the present invention, overcoming the limitations of the prior art, is presented. In FIGS. 11A and 11B, plan views of two preferred embodiments of amplifiers 110A and 110B correspond to the optical trains of FIGS. 10A and 10B, respectively. The multi-stage PLC optical amplifier 110A of FIG. 11A has four EDF coils 46-1 to 46-4, a multi-port optical isolator 114, a PLC 112A, microlens arrays 116 and 118, and a thin-film GFF strip 119A, corresponding to the filter 109A of FIG. 10A. The multi-port optical isolator 114 is mechanically attached to a side of the PLC chip 112A. Even though the multi-port optical isolator 114 is physically one unit, due to its multiport character, it functions as three separate isolators 102 of FIGS. 10A and 10B. The construction of the multi-port optical isolator 114 is described in the US Patent application publication US20070291358A1, which is incorporated herein by reference. The ends of EDF coils 46-1 to 46-4 and the multi-port optical isolator 114 are optically coupled to a side of the PLC 112A by means of the microlens arrays 116 and 118, respectively. The PLC 112A has the elements 104 of FIG. 10A and a plurality of waveguides forming the optical train shown in FIG. 10A. In a preferred embodiment of the present invention, the PLC 112A also has the tunable power splitter 30 and, or the VT-VOA 49.

The thin-film GFF strip 119A is disposed between the ends of EDFs 46-1 to 46-4 and the PLC 112A as shown in FIG. 11A, and is preferably integrated with the microlens array 116. Advantageously, the single strip 119A is used for the six filters 109A of FIG. 10A, whereby a significant cost reduction and, or a significant performance improvement is achieved.

Similarly to FIG. 11A, the multi-stage PLC optical amplifier 110B of FIG. 11B has four EDF coils 46-1 to 46-4, the multi-port optical isolator 114, a PLC 112B, microlens arrays 116 and 118, and a thin-film GFF strip 119B, corresponding to the filter 109B of FIG. 10B. The multi-port optical isolator 114 is mechanically attached to a side of the PLC 112A. The ends of EDF coils 46-1 to 46-4 and the multi-port optical isolator 114 are optically coupled to a side of the PLC 112B by means of the microlens arrays 116 and 118, respectively. The PLC 112B has the elements 106 of FIG. 10B and a plurality of waveguides forming the optical train shown in FIG. 10B. In one embodiment of the present invention, the PLC 112B also has the tunable power splitter 30 and, or the VT-VOA 49.

One difference between FIG. 11B and FIG. 11A is that the thin-film GFF strip 119B is disposed between the multiport isolator 114 and the PLC 112B, and is preferably integrated with the microlens array 118 as shown in FIG. 11B. Advantageously, the single strip 119B is used for six filters 109B of FIG. 10B, whereby a significant cost reduction and, or a significant performance improvement is achieved.

Figure 12:
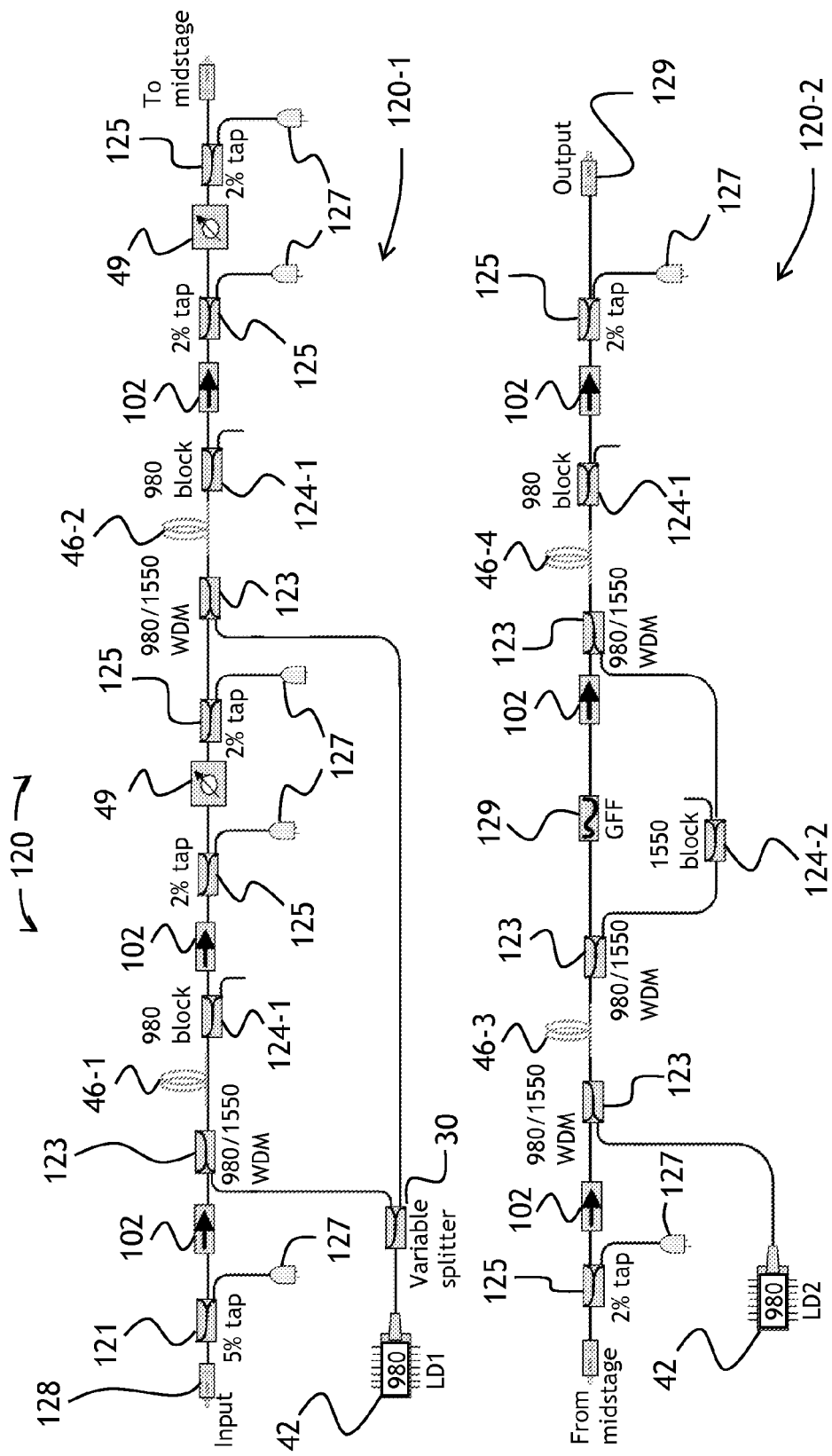
FIG. 12 is an optical diagram of a dual-stage, multi-coil EDFA according to the present invention.

Referring now to FIG. 12, an optical diagram of a dual-stage, multi-coil EDFA 120 according to the present invention is shown. The EDFA 120 has a first stage 120-1, a mid-stage, not shown, and a second stage 120-2. The optical train for signal light to be amplified by the EDFA 120 starts at an input port 128 and ends at an output port 129, wherein the signal optical train has a 5% tap 121, six isolators 102, four 980 nm/1550 nm WDMs 123, EDF coils 46-1 to 46-4, three 980 nm blocking filters 124-1, six 2% taps 125, two VT-VOAs 49 of FIGS. 5 and 6, a pump bypass filter 123, and a GFF 129. The optical train for pump light has two 980 nm pump laser diodes 42, the variable splitter 30 of FIGS. 3 to 5, and the 1550 nm blocking filter 124-2. The EDFA 120 also has seven photodetectors 127 for measuring optical power levels at various points along the optical train of the signal. Fiber lengths of the coils 46-1 to 46-4 generally differ from coil to coil, even though they were not optimized for the first prototype built. The EDF coils 46-1 and 46-2 of the first stage 120-1 are forward-pumped with a single laser diode 42 through the tunable, or variable, splitter 30 and two WDMs 123, although other pumping direction combinations, e.g. the combinations shown in FIGS. 4A to 4D, can be utilized as well. Pumping of the EDF coils 46-3 and 46-4 of the second stage 120-2 is realized by using the pump bypass filter 123 and the 1550 nm blocking filter 124-2, so as to pump the EDF coil 46-4 with a residual pump light that remained unabsorbed by the EDF coil 46-3. A plurality of 980 nm blocking filters is also provided after the coils 46-1, 46-2, and 46-4, to block unused pump light. Further, the EDFA 120 has a controller, not shown, for controlling the pump lasers 42, the variable splitter 30, and the VT-VOAs 49. Finally, in one embodiment, the amplifier 120 has an input 2×1 optical switch, not shown, having two inputs and one output connected to the input 128.

Figure 13:
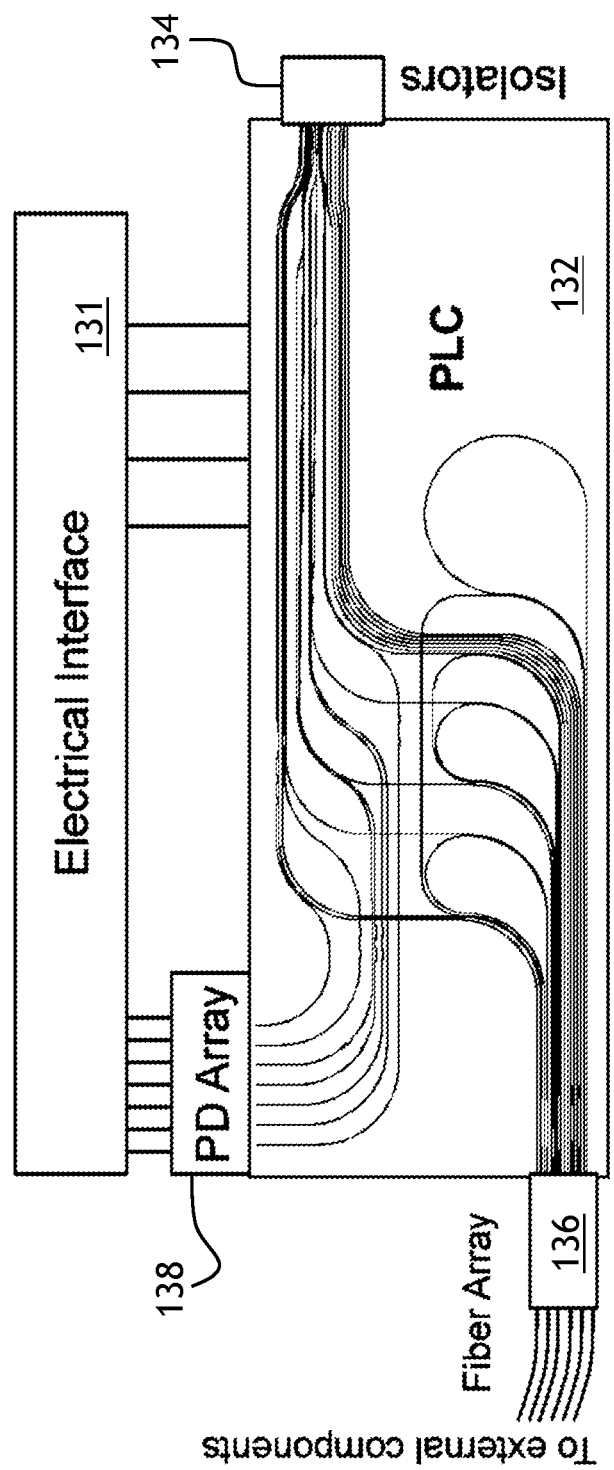
FIG. 13 is a plan view of a PLC optical fiber amplifier according to the present invention.

Turning now to FIG. 13, a packaging of a prototype of the EDFA 120 of FIG. 12 is illustrated. The elements 121, 123, 124-1, 124-2, 125, and 49 of FIG. 12, and the optional 2×1 optical switch are planar structures disposed on a single PLC chip 132 of FIG. 13. The isolators 102 of FIG. 12 are a single multiport isolator 134 side-mounted to the PLC chip 132, similar to the above described isolator 114 of FIGS. 11A and 11B. The seven detectors 127 of FIG. 12 are a single photodiode (PD) array 138 side-mounted to the PLC chip 132. The remaining optical components of the optical train of FIG. 12, that is, fiber coils 46-1 to 46-4, semiconductor pump lasers 42, the GFF 129, the input port 128, and the output port 129 are coupled to optical fibers that are spliced to a single fiber array 136 side-mounted to the PLC 132. An electrical interface 131 receives the photocurrents from the photodiode array 138 and controls the tunable pump splitter 30 and the VT-VOAs 49. In the first prototype of the EDFA 120, the GFF 129 is fiber-coupled through the fiber array 136; however, according to the present invention, the GFF 129 is preferably side mounted as shown in FIGS. 11A and 11B, wherein the filters 119A and 119B are side-mounted to the PLCs 112A and 112B, respectively.

The embodiment 120 of a fiber amplifier shown in FIG. 12 will work with EDF and with other types of amplifier optical fibers as well, that is, optical fibers doped with suitable rare earth elements, such as ytterbium doped fibers used for amplifying light at a wavelengths of approximately 1050+−30 nm. Further, any suitable tunable pump splitter can be used, although the PLC-based tunable pump splitter is preferable, due to the important advantages associated with utilizing PLC according to the present invention. The pump laser types that can be used include single-emitter semiconductor lasers, fiber-coupled multi-emitter laser bars, multi-laser diodes, and so forth. Furthermore, a second pump laser can be coupled to the splitter 30 if required, to "back up" the laser 42 and therefore to increase the overall reliability of the fiber amplifier 120.

The EDFA 120 is assembled according to an exemplary assembly procedure having the following steps:

(a) splicing fiber coupled optical elements, including the pump lasers 42, and the EDF coils 46-1 to 46-4, to the fiber array 136;

(b) aligning the fiber array 136, the photodetector array 138, and the multi-port isolator 134 to the side surface encompassing the PLC 132 along the perimeter of the PLC 132, so as to: produce the photocurrents by the photodiodes 138; amplify light coupled to the input port 128; and couple the amplified light to the output port 129;

(c) attaching the fiber array 136, the photodetector array 138, and the multi-port isolator 134 to the side surface of the PLC 132.

Figure 14:
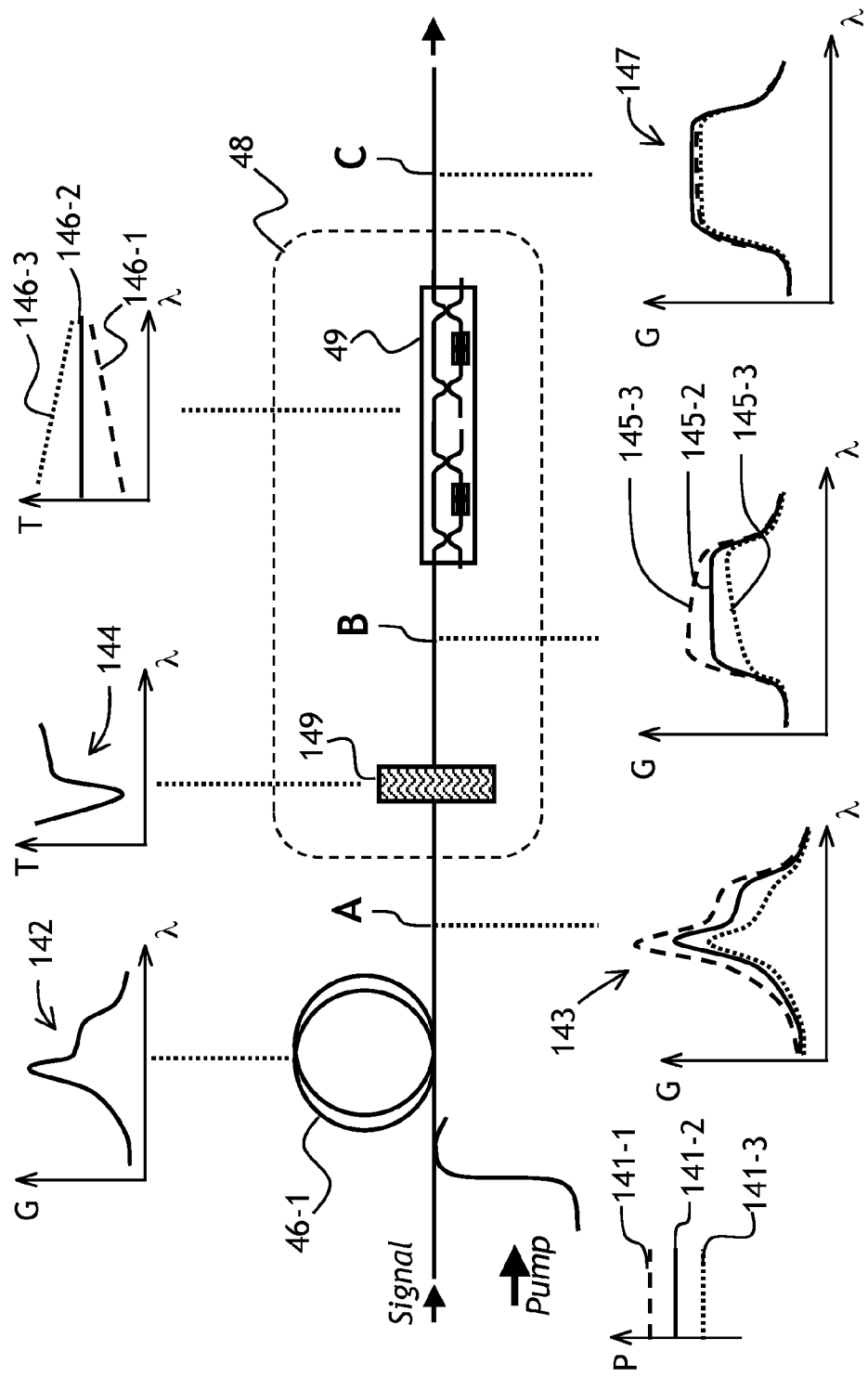
FIG. 14 is an optical circuit having serially connected EDF, GFF, and VT-VOA.

The function of a GFF and of a VT-VOA of the present invention, in their application to controlling the optical gain characteristics of an EDFA of the present invention, will now be explained in more detail. Referring to FIG. 14, a diagram illustrating the gain tilt variation with optical power of the pump and a setting of a VT-VOA is presented. The diagram of FIG. 14 corresponds to the optical amplifier 40A of FIG. 4A and to the optical amplifier 50 of FIG. 5. The signal optical train in FIG. 14 has the EDF coil 46-1 serially connected to a GFF 149 and to the VT-VOA 49. Horizontal arrows in FIG. 14 depict the direction of propagation of an optical signal being amplified. The EDF coil 46-1 is forward-pumped by a pump laser diode, not shown in FIG. 14. The optical power of the pump is varied by either varying the pump current, or the splitting ratio of the tunable splitter 30. In this example, three levels of pump power are considered, which are represented by dotted, solid, and dashed lines 141-1, 141-2, and 141-3, respectively. A nominal optical gain spectrum of the EDF coil 46-1 is shown at 142. When the pump power varies between the three levels 141-1, 141-2, and 141-3, the optical gain at a location A in FIG. 14 changes as illustrated at 143 with corresponding dotted, dashed, and solid lines. The GFF 149 having a fixed transmission spectrum 144 flattens the gain at a location B as shown at 145-1, 145-2, and 145-3. Note that the gain flatness at 145-1, 145-2, and 145-3 is substantially the same, but the gain tilt varies. The VT-VOA 49 is controlled to have transmission spectra 146-1, 146-2, and 146-3 in synchronism with the power levels 141-1, 141-2, and 141-3, respectively, so that at a location C gain profiles 147 are substantially the same, having a zero gain tilt. However, it is known to those skilled in the art that, when pump power changes, the noise figure and other gain characteristics, such as the gain ripple, generally change as well; therefore, with the apparatus shown in FIG. 14, one can adjust and improve various gain characteristics while keeping the average gain and gain tilt substantially the same. In this way, the noise figure of the EDFA of the present invention can be minimized or optimized across the gain spectrum; maximum required pump power can be reduced; the gain ripple can be reduced; and the transient characteristics of the EDFA can be improved.

The GFF 149 is preferably a thin-film filter side-mounted to a PLC, as is shown in FIGS. 11A and 11B. Alternatively, the GFF 149 can be built as a succession of MZ filters on the same PLC, that is, it can be integrated on the PLC with the VT-VOA 49, to serve as the mid-stage unit 48 of FIG. 4.

Figure 15:
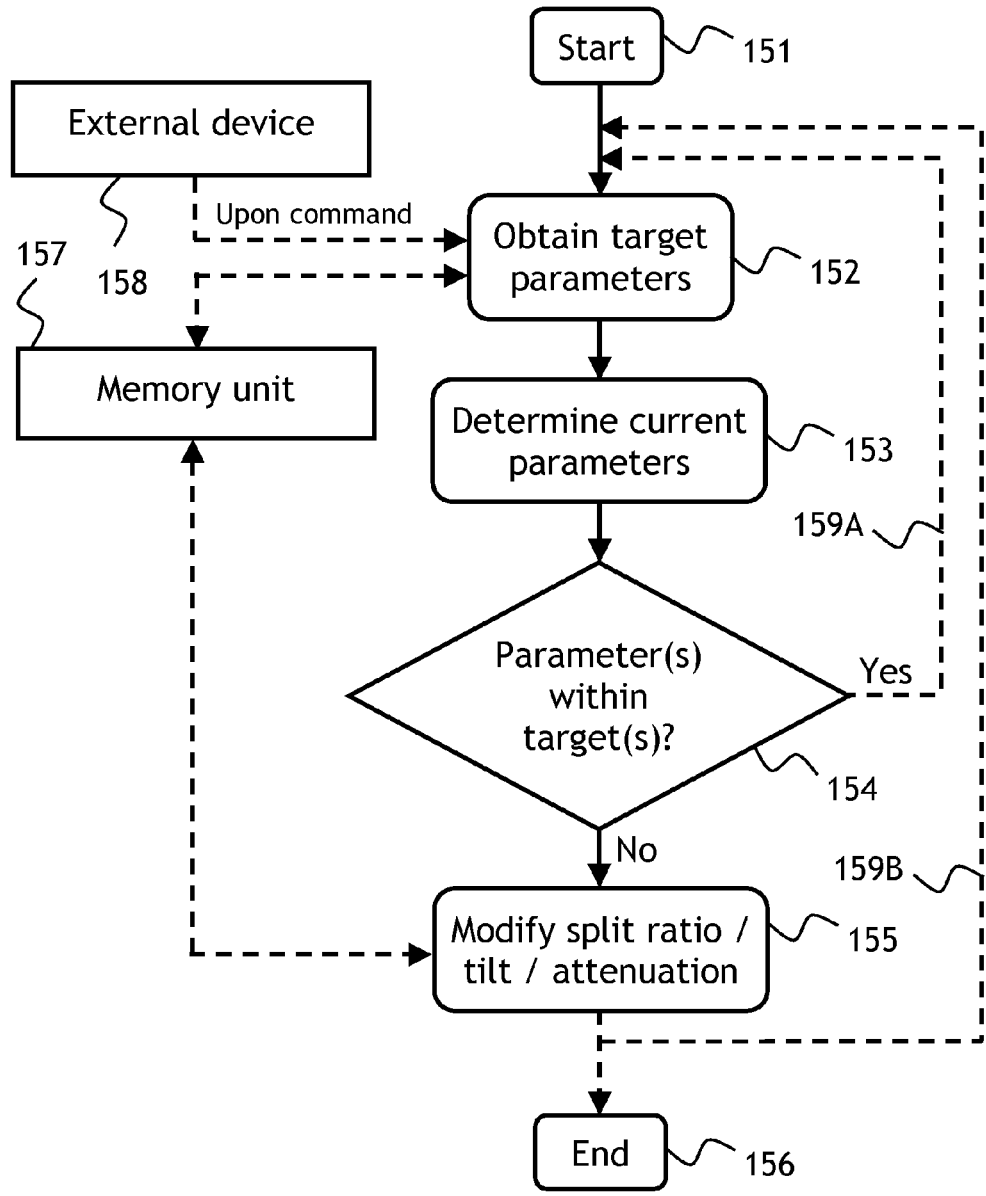
FIG. 15 is a block diagram of an optical amplifier control procedure according to the present invention.

Referring now to FIG. 15, a block diagram of a control procedure to control the optical amplifier 120 of FIG. 12 is shown. The procedure begins at a step 151. The procedure is initiated at a startup of the optical amplifier 120. At a step 152, the amplifier parameters such as the average gain coefficient, the gain tilt, the gain ripple parameter, the maximum pump power parameter, and the noise figure parameter of the optical amplifier are obtained from a memory unit 157 of the amplifier, or preferably upon a command from an external device 158. Further, at a step 153, the current parameters of the optical amplifier are determined or evaluated based upon measured photocurrents of the photodetectors 127 coupled to the optical taps 121 and 125 along the optical train of the amplifier 120 of FIG. 12. The relationship between measured photocurrents and the parameters being evaluated depends on a particular amplifier construction. These relationships and dependencies are established during an EDFA design stage, by performing a computer simulation of the amplifier's performance using a suitable simulation software. Then, at a step 154, a decision is made whether the parameters determined are within the target boundaries. If they are, the procedure loops back to the step 152 as is shown by a dashed line 159A. If they are not, then the optical pump power levels of the laser diodes 42 and, or the splitting ratio of the variable splitter 30 and, or the attenuation and, or tilt of the VT-VOAs 49 are adjusted at a step 155, so as to bring the actual parameter values closer to the target parameter values. The magnitudes of the adjustments required, in dependence on deviations from the target parameters, are determined in advance, e.g. by a computer simulation of the EFDA 120, and are stored in the memory unit 157 of the amplifier 120. After the adjustment is completed, the procedure ends at 156 or, alternatively, it cycles back to the step 152 as is shown with a dashed line 159B. At the step 152, the target amplifier parameters are updated upon a command from the external device 158, or retrieved again from the memory unit 157 so as to repeat the cycle of steps 152 to 155 at pre-defined time intervals.

A particular emphasis may be given to certain sub-groups of the amplifier parameters within the general framework of the control procedure of FIG. 15. A first exemplary approach is to use the procedure of FIG. 15 for optical gain tilt control. Using multiple VT-VOAs 49, instead of a single tilter, has the advantage of the optical loss distributed over the entire amplification train of the amplifier 120. Furthermore, a maximum tilt value can be increased when multiple tilters are employed.

A second exemplary approach is to use the procedure of FIG. 15 to lower the noise figure, to reduce gain ripple, or in other words to improve gain flatness, to reduce transient gain variations, and to lower the maximum required pump power, without changing the average gain or the gain tilt, as illustrated in FIG. 14. Having multiple VT-VOAs 49 in the optical train of the amplifier 120 allows for a better optimization than a single VT-VOA 49.

A third exemplary approach is to adjust the tilt of the VT-VOAs 49 such that the total tilt is constant, and thus the spectral shape the optical gain is not changed at all. In this case, other parameters, such as amplified spontaneous emission (ASE) spectral tilt, can be advantageously optimized, with a minimal or no impact on the rest of the parameters.

Any combination of the above described control methods can be used to control the amplifier 120 of FIG. 12. Furthermore, it is to be understood that other amplifier embodiments, for example the amplifier embodiments illustrated in FIGS. 4A to 4D, 5, 10A and 10B, 11A and 11B, and 13, can utilize a control procedure of FIG. 15.

Figure 16:
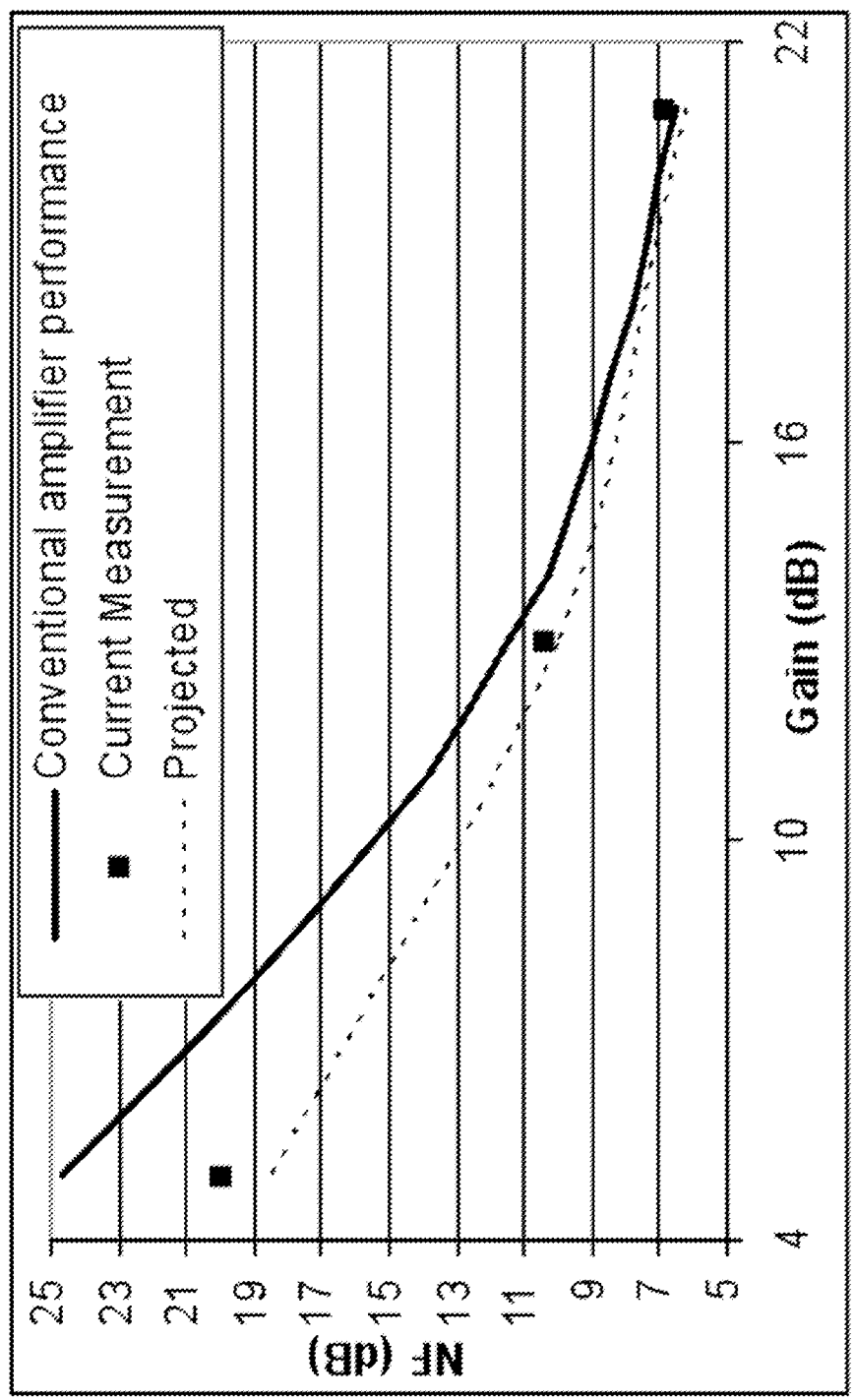
FIG. 16 is a diagram showing measured noise figure (NF) vs. optical gain.

Turning now to FIG. 16, the noise figure of the prototype of the amplifier 120 of FIG. 12, implemented in PLC as is shown in FIG. 13, is plotted as a function of the average gain coefficient. Both the noise figure and the average gain coefficient are plotted in dB units, the measured values being represented by squares, the anticipated values for a product being shown as dotted line, and the actual values of a conventional amplifier of the prior art being shown as a solid line. In the calculations, it was assumed that the conventional amplifier has three EDF coils an one VOA. One can see that the PLC amplifier prototype of the present invention has a significantly lower noise figure, especially for lower gain values. Simulations prove that this advantage is mostly due to the variable splitter 30, and to a lesser degree due to four EDF coil construction of the amplifier 120. This advantage is despite of the fact that due to the time constraints, the PLC chip used in the amplifier prototype did not have anti-reflection coatings applied, the EDF lengths were not optimized, and only one GFF 129 was used. The dotted line illustrates an expected noise figure when these three issues are resolved. Based on other measurements of the PLC elements, it is believed that even "Projected" line can be exceeded by further optimization of the PLC components.

What is claimed is:

1. An optical amplifier having an average gain coefficient, a gain tilt, a gain ripple parameter, a maximum pump power parameter, and a noise figure parameter, the optical amplifier comprising:

an input port for inputting light;

a first amplifier optical fiber optically coupled to the input port, for amplifying light;

a second amplifier optical fiber optically coupled to the first amplifier optical fiber, for further amplifying light;

an output port for outputting light amplified by the second amplifier optical fiber;

a semiconductor laser for pumping the first and the second amplifier optical fibers, in dependence upon a drive signal applied thereto;

a tunable optical power splitter optically coupled to the semiconductor laser, for splitting light from said semiconductor laser into a first path and a second path in dependence upon a first control signal applied to the optical power splitter, wherein the first and the second paths are optically coupled to the first and the second amplifier optical fibers, respectively; and a controller suitably programmed to provide a pre-determined value of the average gain coefficient and, or a pre-determined value of the gain tilt, while keeping the gain ripple parameter, the maximum pump power parameter, and the noise figure parameter below pre-defined threshold levels, by applying the drive signal to the semiconductor laser, and applying the first control signal to the tunable optical power splitter.

2. An optical amplifier of claim 1, further comprising:
serially connected first and second Mach-Zehnder interferometers disposed between the first and the second amplifier fibers, for correcting the gain tilt of the optical amplifier and, or for variably attenuating light passing therethrough, in dependence upon second and third control signals applied to the first and the second Mach-Zehnder interferometers, respectively;
wherein the controller is suitably programmed to provide the pre-determined value of the average gain coefficient and, or the pre-determined value of the gain tilt, while keeping the gain ripple parameter, the maximum pump power parameter, and the noise figure parameter below the pre-defined threshold levels, by applying the second and the third control signals to the first and the second Mach-Zehnder interferometers, respectively.

3. A method of controlling an optical amplifier of claim 1, comprising:
(a) obtaining target values of at least one of: the average gain coefficient, the gain tilt, the gain ripple parameter, the maximum pump power parameter, and the noise figure parameter of the optical amplifier;
(b) determining actual values of at least one of: the average gain coefficient, the gain tilt, the gain ripple parameter, the maximum pump power parameter, and the noise figure parameter of the optical amplifier; and
(c) based on the target values obtained in step (a) and the actual values determined in step (b), adjusting the drive signal applied to the semiconductor laser; and, or adjusting the first control signal applied to the optical power splitter, so as to bring the actual values closer to the target values.

4. A method of controlling an optical amplifier of claim 2, comprising:
(a) obtaining target values of at least one of: the average gain coefficient, the gain tilt, the gain ripple parameter, the maximum pump power parameter, and the noise figure parameter of the optical amplifier;
(b) determining actual values of at least one of: the average gain coefficient, the gain tilt, the gain ripple parameter, the maximum pump power parameter, and the noise figure parameter of the optical amplifier; and
(c) based on the target values obtained at step (a) and the actual values determined at step (b), adjusting the drive signal applied to the semiconductor laser; and, or adjusting the first control signal applied to the tunable optical power splitter; and, or adjusting the second and the third control signals applied to the first and the second tunable Mach-Zehnder interferometer, respectively, so as to bring the actual values closer to the target values.

5. An optical amplifier of claim 1, further comprising serially connected first and second tunable Mach-Zehnder interferometers disposed between the first and the second amplifier fibers, for correcting the gain tilt of the optical amplifier and, or for variably attenuating light passing therethrough, in dependence upon second and third control signals applied to the first and the second Mach-Zehnder interferometers, respectively.

6. An optical amplifier of claim 5, further comprising a planar lightwave circuit, wherein the planar lightwave circuit comprises the first and the second Mach-Zehnder interferometers.

7. An optical amplifier of claim 6, further comprising a gain flattening filter for flattening a gain profile of the optical amplifier, wherein the gain flattening filter is mechanically coupled to a side surface of the planar lightwave circuit, and optically coupled to the first and the second amplifier optical fibers.

8. An optical amplifier of claim 7, wherein the gain flattening filter comprises a thin-film optical filter.

9. An optical amplifier of claim 6, wherein the tunable optical power splitter comprises a third tunable Mach-Zehnder interferometer, wherein the planar lightwave circuit comprises the tunable optical power splitter.

10. An optical amplifier of claim 1, further comprising a planar lightwave circuit, wherein the planar lightwave circuit comprises the tunable optical power splitter.

11. An optical amplifier of claim 10, wherein the tunable optical power splitter comprises a Mach-Zehnder interferometer.

12. An optical amplifier of claim 10, further comprising a multi-port optical isolator for suppressing backward-propagating light, wherein the multi-port optical isolator is optically and mechanically coupled to a side surface of said planar lightwave circuit.

13. An optical amplifier of claim 12, further comprising a gain flattening filter for flattening a gain profile of the optical amplifier, wherein the gain flattening filter is mechanically coupled to a side surface of the planar lightwave circuit, and optically coupled to the first and the second amplifier optical fibers.

14. An optical amplifier of claim 13, wherein the gain flattening filter comprises a thin-film optical filter.

* * * * *